(12) United States Patent
Loui et al.

(10) Patent No.: US 7,298,895 B2
(45) Date of Patent: Nov. 20, 2007

(54) METHOD FOR AUTOMATICALLY CLASSIFYING IMAGES INTO EVENTS

(75) Inventors: Alexander C. Loui, Penfield, NY (US); Eric Pavie, Paris (FR)

(73) Assignee: Eastman Kodak Company, Rochester, NY (US)

( * ) Notice: Subject to any disclaimer, the term of this patent is extended or adjusted under 35 U.S.C. 154(b) by 606 days.

(21) Appl. No.: 10/696,115

(22) Filed: Oct. 29, 2003

(65) Prior Publication Data

US 2004/0208365 A1    Oct. 21, 2004

(51) Int. Cl.
*G06K 9/00*    (2006.01)
*G06K 9/62*    (2006.01)

(52) U.S. Cl. .................. 382/171; 382/224; 382/165; 382/170

(58) Field of Classification Search .......... 382/164, 382/168, 163, 170, 171, 224, 305, 225, 173, 382/177, 229, 260, 128, 165; 709/219; 375/240.1; 358/3.01
See application file for complete search history.

(56) References Cited

U.S. PATENT DOCUMENTS

| | | | |
|---|---|---|---|
| 4,396,903 A | | 8/1983 | Habicht et al. ............... 382/9 |
| 4,567,610 A | * | 1/1986 | McConnell ............... 382/170 |
| 5,083,860 A | * | 1/1992 | Miyatake et al. ........... 352/129 |
| 5,539,841 A | | 7/1996 | Huttenlocher et al. ...... 382/218 |
| 5,576,759 A | * | 11/1996 | Kawamura et al. .... 348/207.99 |
| 5,594,807 A | * | 1/1997 | Liu ............................. 382/128 |
| 5,598,557 A | | 1/1997 | Doner et al. ............... 395/605 |
| 5,719,643 A | * | 2/1998 | Nakajima .................. 348/700 |
| 5,751,378 A | * | 5/1998 | Chen et al. ................. 348/700 |
| 5,809,161 A | * | 9/1998 | Auty et al. ................. 382/104 |
| 5,842,194 A | | 11/1998 | Arbuckle ..................... 706/52 |

(Continued)

FOREIGN PATENT DOCUMENTS

EP    0 472 806    3/1992

(Continued)

OTHER PUBLICATIONS

Hansen et al.(Models for Time Coalescence in Event Logs) ,Jeffery P. Hansen and Daniel P. Siewiorek, Department of Electric and Computer Engineering ,Carnegie Mellon University,Pittsburg,PA15213 USA.*

(Continued)

*Primary Examiner*—Samir Ahmed
*Assistant Examiner*—Nancy Bitar
(74) *Attorney, Agent, or Firm*—Robert Luke Walker

(57) ABSTRACT

A method for obtaining and automatically classifying images into events comprising the steps of: (a) obtaining a group of images from a digital source, wherein the images are in chronological order; (b) transferring the group of images to a computer system; said computer system (c) clustering the images into smaller groups based on chronological image similarity of nearby images by computing histograms of the images and comparing histogram intersection values obtained therefrom with one or more thresholds, whereby the clustering based on chronological image similarity is done in at least one stage by comparing each image with its direct neighboring images; and (d) evaluating the clustered images against a final condition related to at least one of a predetermined group maximum for the number of smaller groups and a predetermined maximum number of isolated pictures, whereby the smaller groups are classified as events if the final condition is met.

10 Claims, 13 Drawing Sheets

U.S. PATENT DOCUMENTS

| | | | |
|---|---|---|---|
| 5,872,859 A * | 2/1999 | Gur et al. | 382/128 |
| 6,012,091 A | 1/2000 | Boyce | 709/219 |
| 6,865,297 B2 * | 3/2005 | Loui et al. | 382/224 |
| 6,993,180 B2 * | 1/2006 | Sun et al. | 382/165 |
| 2003/0198390 A1 * | 10/2003 | Loui et al. | 382/224 |
| 2006/0104520 A1 * | 5/2006 | Kraus et al. | 382/225 |
| 2006/0126944 A1 * | 6/2006 | Loui et al. | 382/224 |
| 2007/0115373 A1 * | 5/2007 | Gallagher et al. | 348/231.3 |

FOREIGN PATENT DOCUMENTS

| | | |
|---|---|---|
| EP | 0 472 806 A2 | 3/1992 |
| EP | 0990996 * | 4/2000 |
| EP | 0990996 A2 * | 4/2000 |
| JP | 0472806 * | 4/1992 |

OTHER PUBLICATIONS

XP-002140074,"Introduction to Statistical Pattern Recognition","Clustering"Chapter II ,Fukanage,pp. 509-523.*

"Introduction to Statistical Pattern Recognition" by Keinosuki Fukanaga. From Introduction to Statistical Pattern Recognition, Boston, Academic, U.S., pp. 508-518.

"Models for Time Coalescence in Event Logs" by Jeffery P. Hansen and Daniel P. Siewiorek. Fault-Tolerant Parallel and Distributed Systems, 1992. Digest of Papers, 1992 IEEE Workshop on Amherst, MA, USA, Jul. 6-7, 1992, Los Alamitos, CA, USA, IEEE Computer Soc, US, Jul. 6, 1992, pp. 221-227.

"Automatic Video Indexing and Full-Video Search for Object Appearances" by Akio Nagasaka and Yuzur Tanaka. Visual Database Systems, II. Second Working Conference, Sep. 30-Oct. 3, 1991, Budapest, Hungary; Amsterdam, Netherlands, 1991, pp. 113-127.

"Semantic Agents for Content-Based Discovery in Distributed Image Libraries" by Eddie C. Shek, Asha Vellaikal, Son K. Dao, Brad Perry. Content-Based Access of Image and Video Libraries, 1998, Proceedings IEEE Workshop on Santa Barbara, CA, USA, Jun. 21, 1998, Los Alamitos, CA, USA, IEEE Computer Soc., USA, pp. 19-23.

"Image retrieval using efficient local-area matching" by V.V.Vinod, Hiroshi Murase. Machine Vision and Applications, vol. 11, No. 1, Jun. 1998, p. 7-15.

Nagasaka A et al.: "Automatic Video Indexing and Full-Video Search for Object Appearances", Visual Database Systems, II. Second Working Conference, Sep. 30-Oct. 3, 1991, Budapest, HU, Amsterdam, NL, 1991, pp. 113-127, XP000473004.

Shek E C et al.: "Semantic Agents for Content-Based Directory in Distributed Image Libraries" Proceedings. IEEE Workshop on Santa Barbara, CA, USA, IEEE Comput. Soc., US, Jun. 21, 1998, pp. 19-23 XP010293861, ISBN: 0-8186-8544-1.

Vinod, V. V., Murase H.: "Image Retrieval Using Efficient Local-Area Matching" Machine Vision and Applications, vol. 11, No. 1, Jun. 1998, pp. 7-15, XP002253163, Heidelberg.

Swain M. J. et al.: "Indexing Via Color Histograms", Proceedings of the International Conference on Computer Vision. Osaka, Dec. 4-7, 1990, Los Alamitos, IEEE Comp. Soc. Press, US, vol. Conf. 3, Dec. 2, 1990 (Dec. 4, 1990), pp. 390-393, XP000242625 ISBN: 0-8186-2057-9.

* cited by examiner

METHOD FOR AUTOMATICALLY CLASSIFYING IMAGES INTO EVENTS

CROSS-REFERENCE TO RELATED PATENT MATERIALS

Reference is made to commonly assigned U.S. Pat. No. 6,606,411, entitled "Method for Automatically Classifying Images into Events" and issued 12 Aug. 2003 in the names of Alexander C. Loui and Eric S. Pavie, and commonly-assigned copending U.S. Ser. No. 10/413,673, entitled "A Method for Automatically Classifying Images into Events" and filed 15 Apr. 2003 in the names of Alexander C. Loui and Eric S. Pavie, both of which are incorporated herein by reference.

FIELD OF THE INVENTION

The invention relates generally to the field of image processing having image understanding that automatically classifies pictures by events and the like and, more particularly, to such automatic classification of pictures by block-based analysis which selectively compares blocks of the images with each other.

BACKGROUND OF THE INVENTION

Pictorial images are often classified by the particular event, subject or the like for convenience of retrieving, reviewing, and albuming of the images. Typically, this has been achieved by manually segmenting the images, or by the below-described automated method. The automated method includes grouping by color, shape or texture of the images for partitioning the images into groups of similar image characteristics.

Although the presently known and utilized methods for partitioning images are satisfactory, there are drawbacks. The manual classification is obviously time consuming, and the automated process, although theoretically classifying the images into events, is susceptible to miss-classification due to the inherent inaccuracies involved with classification by color, shape or texture.

Consequently, a need exists for overcoming the above-described drawbacks. However, in many cases, chronological data such as date and time is not available. The need therefore is to develop an intelligent algorithm to automatically classify and sort images from sets/rolls of pictures into separate events based on image content only. Moreover, such an algorithm should be fully automatic, work on all consumer pictures of different sizes without needing date or time information, and be adaptable to different parameters.

SUMMARY OF THE INVENTION

The present invention is directed to overcoming one or more of the problems set forth above. Briefly summarized, according to one aspect of the present invention, the invention resides in a method for obtaining and automatically classifying images into events comprising the steps of: (a) obtaining a group of images from a digital source, wherein the images are in chronological order; (b) transferring the group of images to a computer system; said computer system (c) clustering the images into smaller groups based on chronological image similarity of nearby images by computing histograms of the images and comparing histogram intersection values obtained therefrom with one or more thresholds, whereby the clustering based on chronological image similarity is done in at least one stage by comparing each image with its direct neighboring images; and (d) evaluating the clustered images against a final condition related to at least one of a predetermined group maximum for the number of smaller groups and a predetermined maximum number of isolated pictures, whereby the smaller groups are classified as events if the final condition is met.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of improved classification of images, notwithstanding the lack of both date and time information, by utilizing a block-based comparison that checks for similarity of subject and background in the images.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

In addition, the term "event" is defined herein as a significant occurrence or happening as perceived by the subjective intent of the user of the image capture device.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning).

Figure 1:
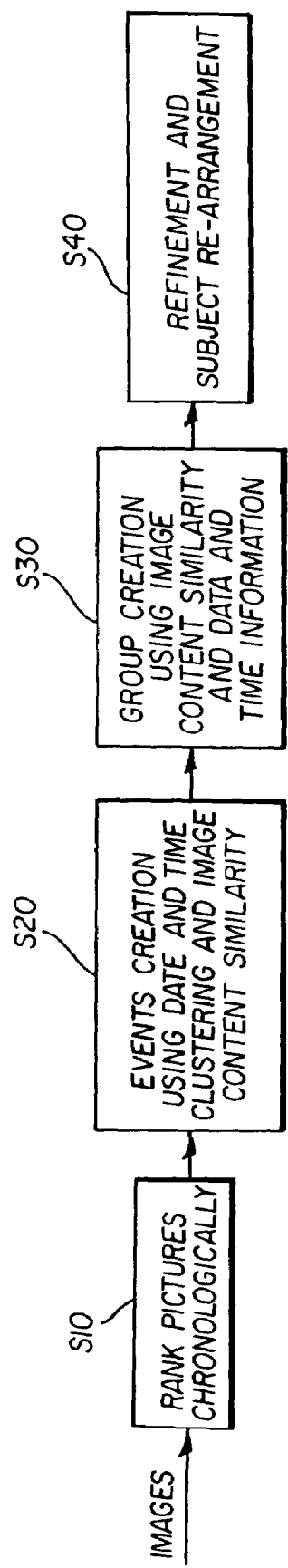
FIG. 1 is a block diagram illustrating an overview of a method for automatically classifying images into events.

Referring to now FIG. 1, there is illustrated a flow diagram illustrating an overview of a method for automatically classifying images into events, as shown in the related U.S. Pat. No. 6,606,411 and copending U.S. Ser. No. 10/413, 673. Digitized images are input into the computer system where a software program will classify them into distinct categories. The images will first be ranked S10 in chronological order by analyzing the time and date of capture of each image. The date and/or time of capture of each picture may be extracted, for example, from the encoded information on the film strip of the Advanced Photo System (APS) images, or from information available from some digital cameras. The representations of the images will then be placed S20 into one of a plurality of distinct events by a date and time clustering analysis that is described below. Within each event, the contents of the images are analyzed S20 for determining whether images closest in time to an adjacent event should be maintained in the event as defined by the clustering analysis, or the adjacent events merged together. After the images are defined into events, a further sub-classification (grouping) within each event is performed. In this regard, the images within each event will then be analyzed by content S30 for grouping images of similar content together, and then the date and time S30 for further refining the grouping.

The event segmentation S20 using the date and time information is by a k-means clustering technique, as will be described in detail below, which groups the images into events or segments. A boundary check is then performed on the segments S20 for verifying that the boundary images should actually be grouped into the segment identified by the clustering, as will also be described below.

These groups of images are then sent to a block-based histogram correlator S30 for analyzing the content. For each event or segment sent to the correlator, a content or subject grouping S30 is performed thereon for further sub-classifying the images by subject within the particular event segment. For example, within one event, several different subjects may appear, and these subject groupings define these particular subjects. The subject grouping is based primarily on image content, which is performed by a block-based histogram correlation technique. This correlation compares portions of two images with each other, as will also be described in detail below. The result of the ranking is the classification of images of each segment into distinct subject groupings. The date and time of all the images within each subject grouping are then compared to check whether any two or more subject grouping can be merged into a single subject grouping S30.

A refinement and subject re-arrangement analysis S40 will further improve the overall classification and the subject grouping by rearranging certain images within a subject group.

Figure 2:
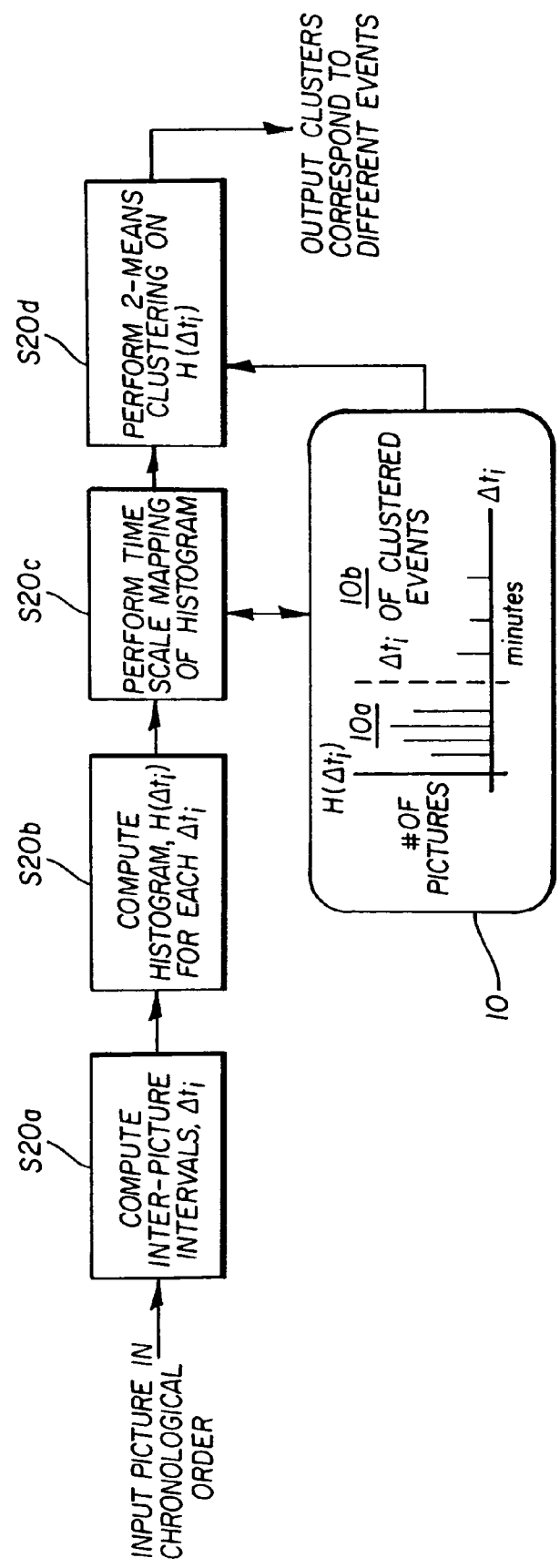
FIG. 2 is a block diagram illustrating a date and time clustering technique for use with the method of FIG. 1.
Figure 3:
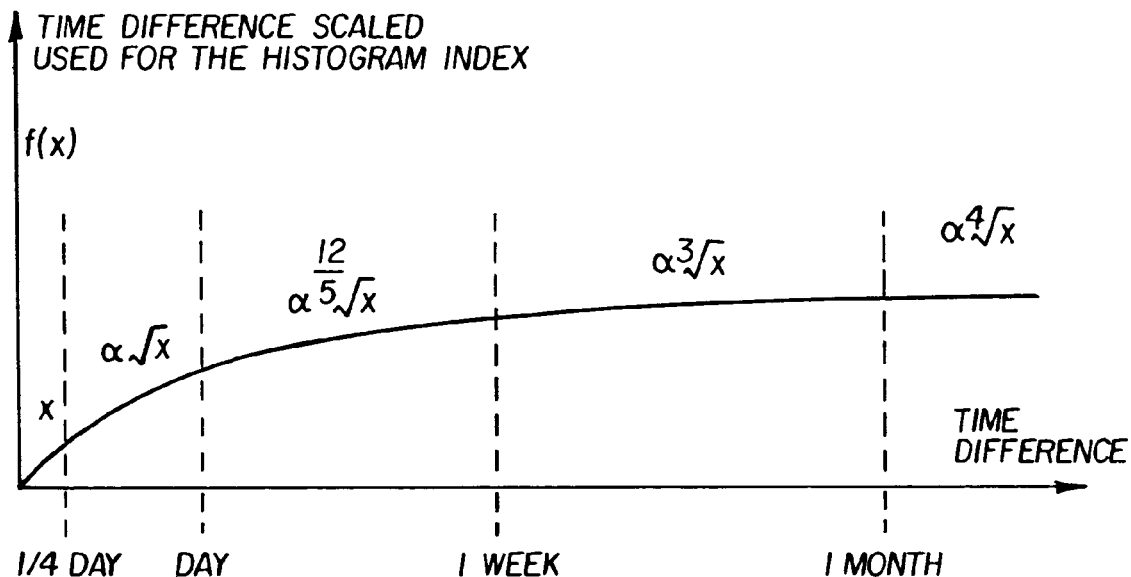
FIG. 3 is a graph illustrating a scaling function used to map the result of the 2-means clustering.

Referring to FIG. 2, there is shown an exploded block diagram illustrating the date and time clustering technique S20. First, the time interval between adjacent pictures (time difference) is computed S20a. A histogram of the time differences is then computed S20b, an example of which is shown in block 10. The abscissa of the histogram is preferably the time in minutes, and the ordinate of the histogram is the number of pictures having the specified time difference. The histogram is then mapped S20c to a scaled histogram using a time difference scaling function, which is shown in FIG. 3. This mapping is to take the pictures with small time difference and substantially maintain its time difference, and to take pictures with a large time difference and compress their time difference.

Figure 4:
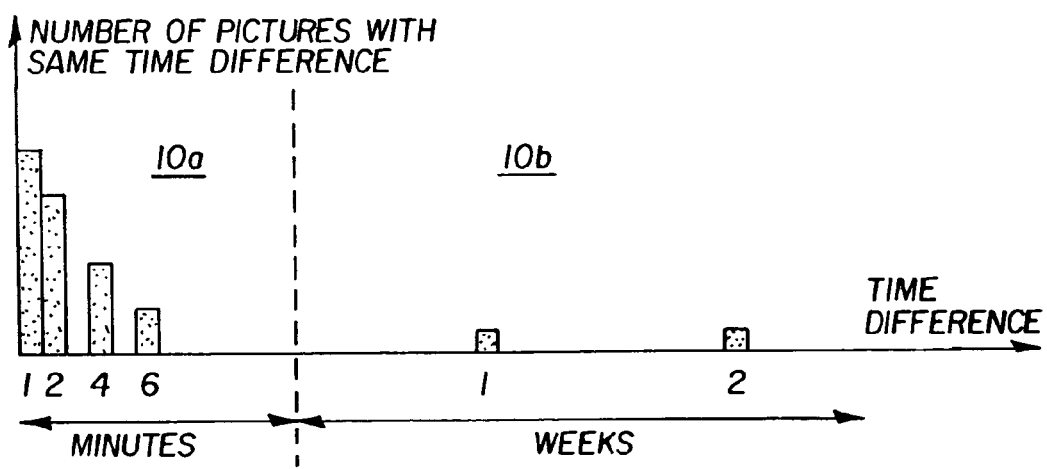
FIG. 4 is a graph illustrating a typical result of the scaling function of FIG. 3.

A 2-means clustering is then performed S20d on the mapped time-difference histogram for separating the mapped histogram 10 into two clusters based on the time difference; the dashed line represents the separation point for the two clusters. For further details of 2-means clustering, Introduction to Statistical Pattern Recognition, $2^{nd}$ edition by Keinosuke Fukunaga 1990 may be consulted, and therefore, the process of 2-means clustering will not be discussed in detail herein. Referring briefly to FIG. 4, the result of 2-means clustering is the segmentation of the histogram into two portions 10a and 10b. Normally, events are separated by large time differences. The 2-means clustering, therefore, is to define where these large time differences actually exist. In this regard, the right portion 10b of the 2-means clustering output defines the large time differences that correspond to the event boundaries.

Figure 5:
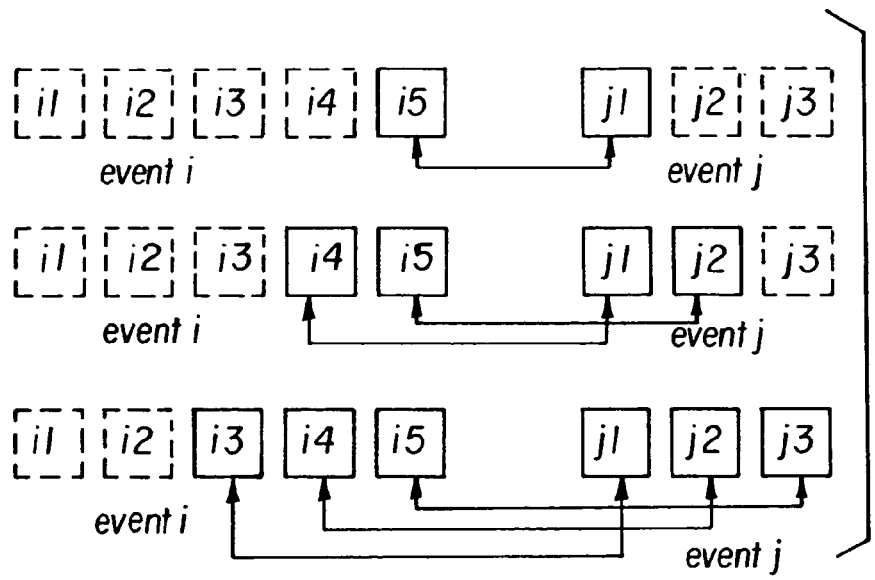
FIG. 5 is a diagram illustrating a block diagram of an event boundary checking after the date and time clustering.

Referring to FIG. 5, there is illustrated an example of boundary checking between events. For two consecutive events i and j, a plurality of block-based, histogram comparisons are made to check if the pictures at the border of one event are different from the pictures at the border of the other event. If the comparison of content is similar, the two segments are merged into one segment. Otherwise, the segments are not merged. Preferably, the comparisons are performed on the three border images of each event (i3, i4, i5 with j1, j2, j3), as illustrated in the drawing. For example, image i5 is compared with image j1 and etc. This block-based histogram comparison technique will be described in detail hereinbelow.

Figure 6:
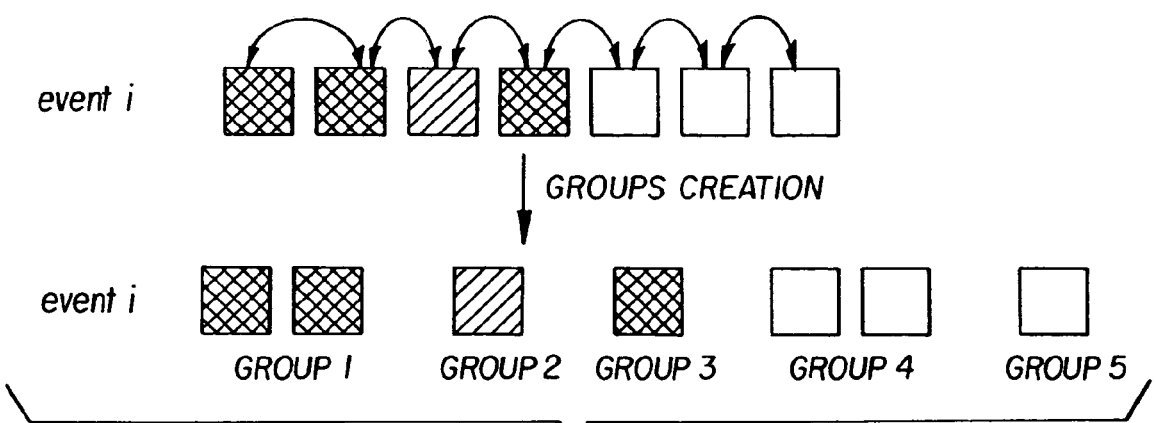
FIG. 6 is a diagram illustrating grouping of images within each event based on content.

Referring to FIG. 6, there is illustrated an overview of subject (content) grouping for each segmented event. Within each segmented event i, adjacent pictures are compared (as illustrated by the arrows) with each other using the below-described, block-based histogram technique. For example, the block-based histogram technique may produce five subject groupings (for example groups 1-5) from the one event i, as illustrated in the drawing. The arrangement of the subject grouping is stored for future retrieval during the subject arrangement step s40. In particular, the subject grouping having a single image is stored (for example groups 2, 3, and 5).

Figure 7:
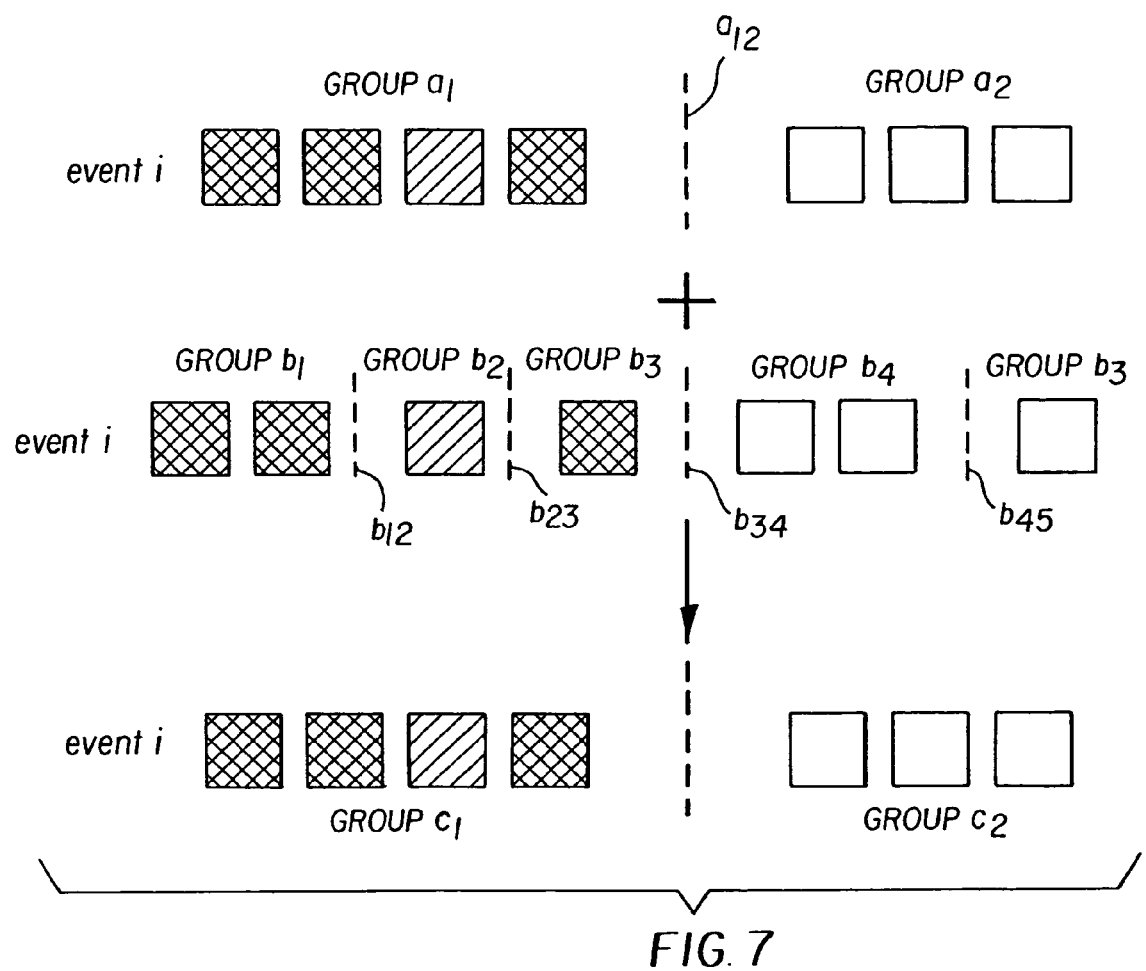
FIG. 7 is a block diagram of a group-merging step.

Referring to FIG. 7, after the grouping by content, a time and date ordering is performed on the groupings for merging groups together based on a time and date analysis. A histogram of the time difference between adjacent images in the event is computed, similar to FIG. 4. A predetermined number of the largest time differences (for example boundary $a_{12}$) are compared with the boundaries (for example boundaries $b_{12}$, $b_{23}$, $b_{34}$, $b_{45}$) of the subject grouping determined by the block-based analysis. The predetermined number of largest time differences are determined by dividing the total number of images within an event by the average number of picture per group (four is used in the present embodiment). If the boundary of the subject grouping matches the boundary based on the chosen time differences, the subject groupings will not be merged. If there is not a match between the two boundaries, the subject groupings having a boundary not having a matched time difference in the histogram will be merged into a single subject grouping (for example groups $b_1$, $b_b$, $b_3$ merged into resulting group $c_1$).

Figure 8:
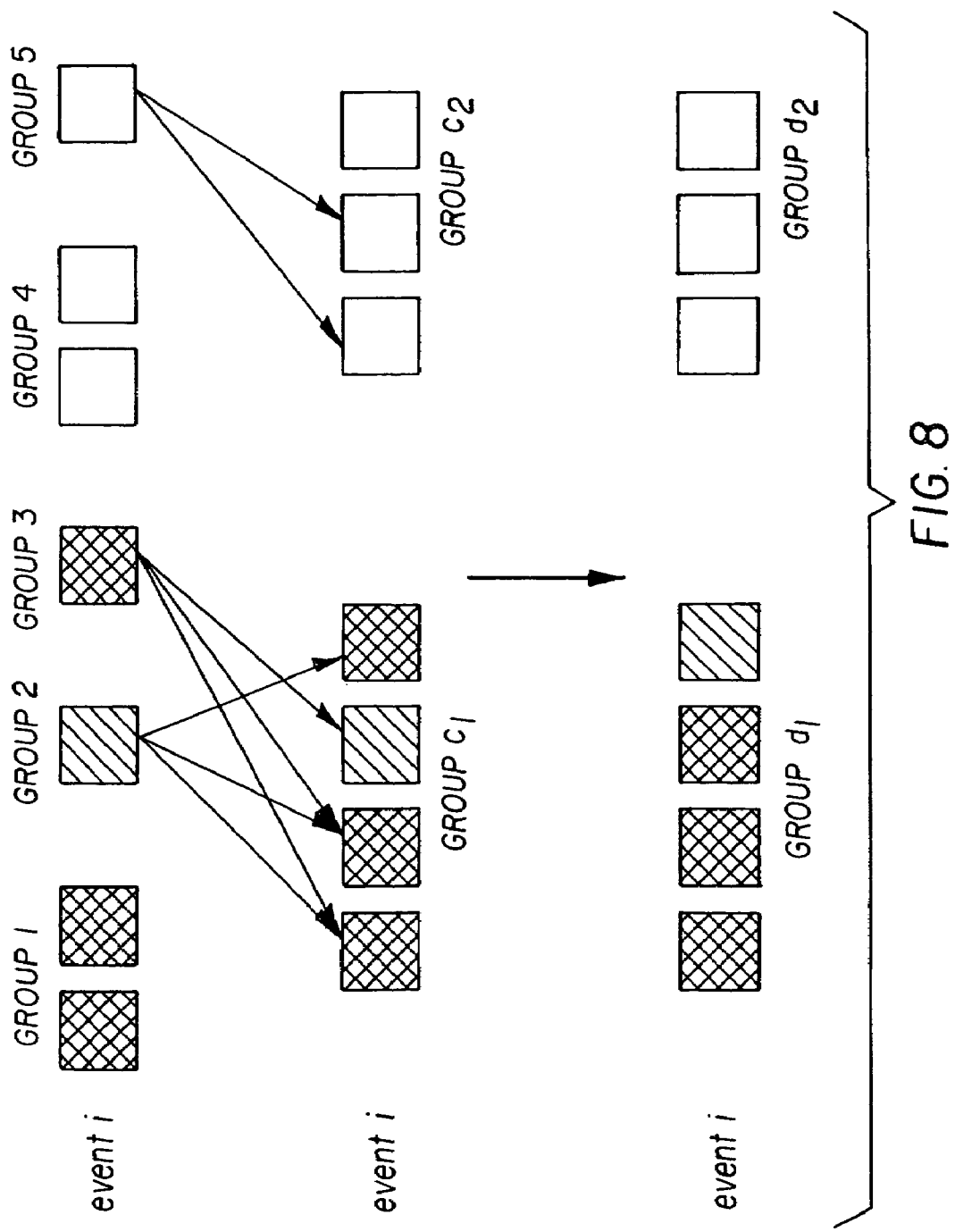
FIG. 8 is a block diagram of image re-arrangement within each group.

Referring to FIG. 8, there is illustrated a diagram of image re-arrangement within each group. The arrangement of the initial subject groupings is retrieved for identifying subject groupings that contain single images (for example the groups with a single image of FIG. 6—groups 2, 3, and 5 that are re-illustrated as groups 2, 3, and 5 in FIG. 8). Any single images from the same subject grouping that are merged as identified by the merged subject grouping (for example, groups $c_1$ and $c_2$ of FIG. 7) are compared with all other images in the merged subject grouping, as illustrated by the arrows. This comparison is based on block-based histogram analysis. If the comparisons are similar, these images will be re-arranged so that the similar images are located adjacent each other, for example groups $d_1$ and $d_2$.

Further refinement is done by comparing any group that still contains a single image after the above procedure, with all the images in the event. This is to check if these single image groups can be better arranged within the event grouping. This comparison is similar to the subject re-arrangement step of FIG. 8.

Figure 9A:
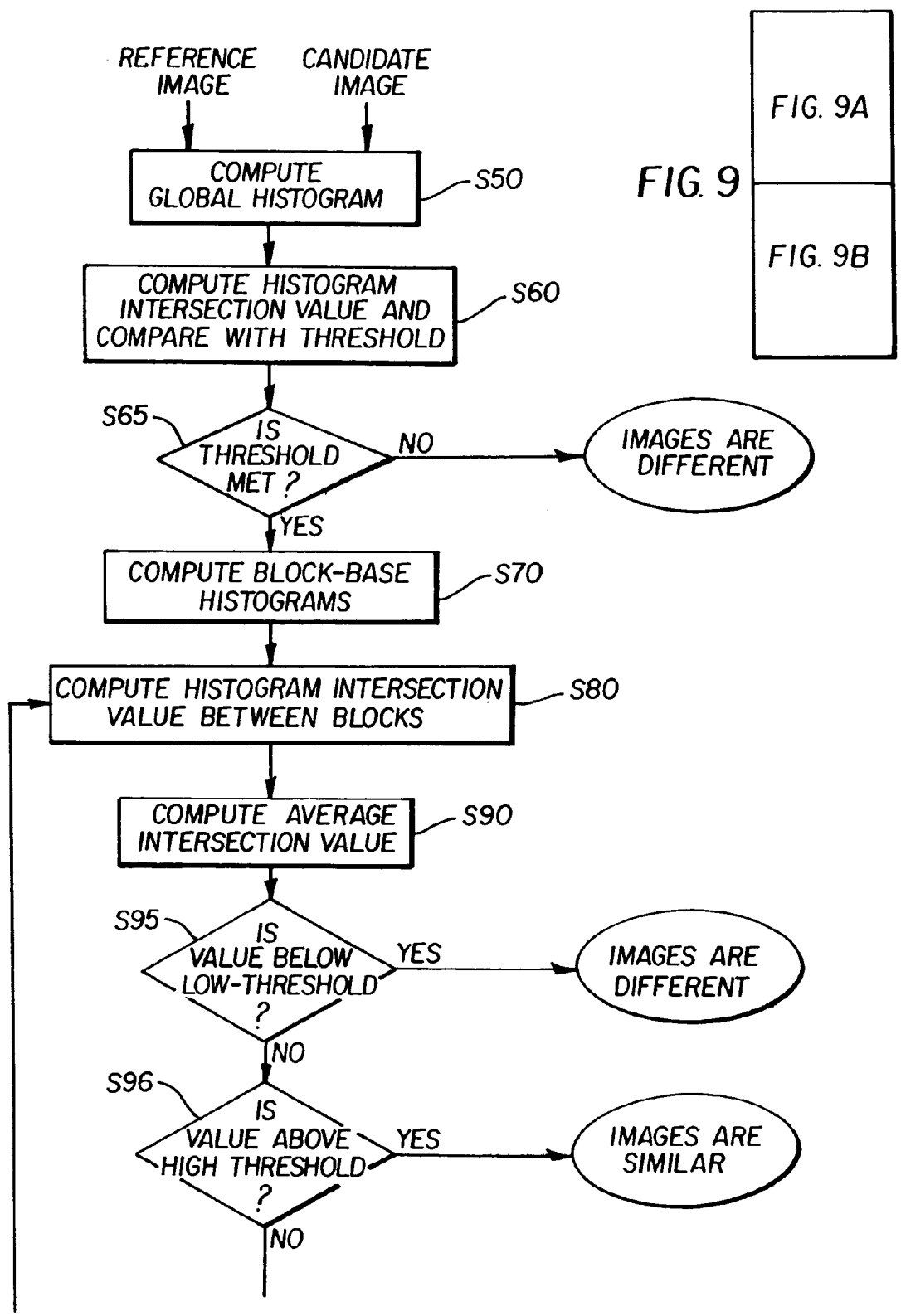
FIGS. 9A and 9B show a flowchart of a block-based histogram correlation technique.
Figure 9B:
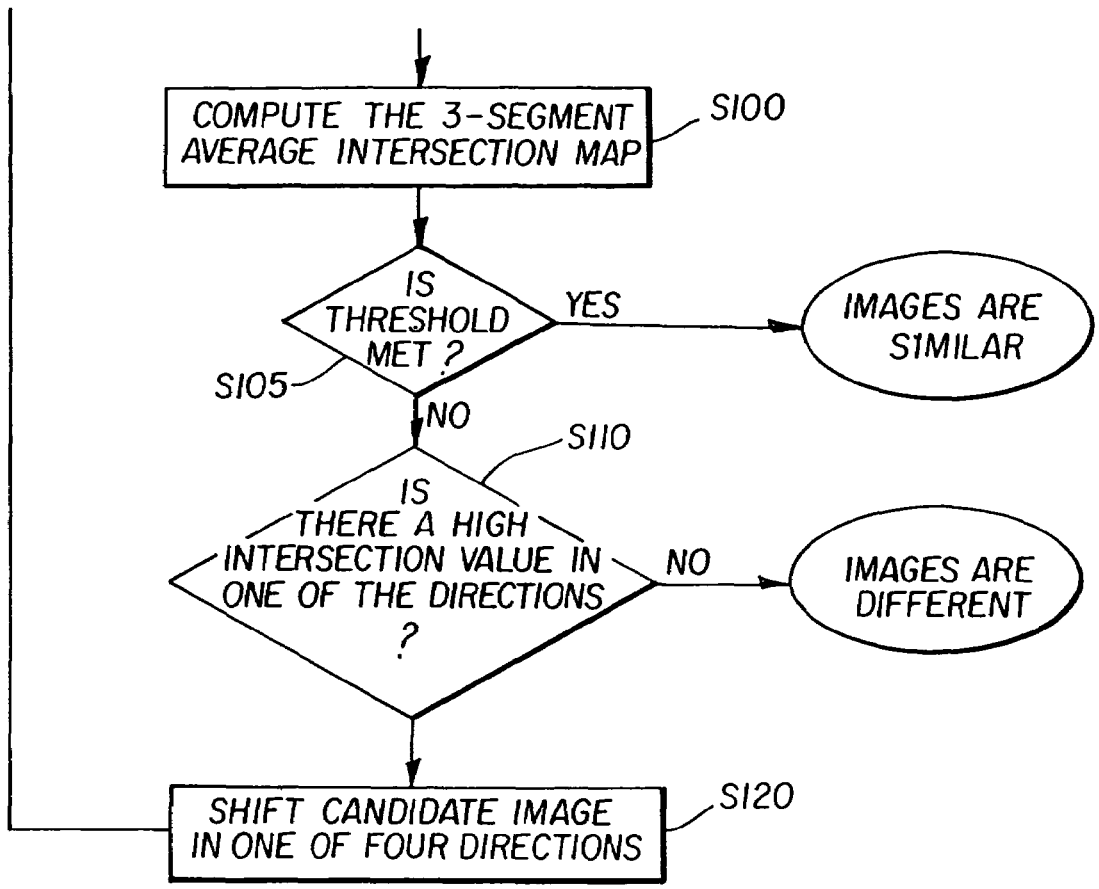
Figures 10, 11:
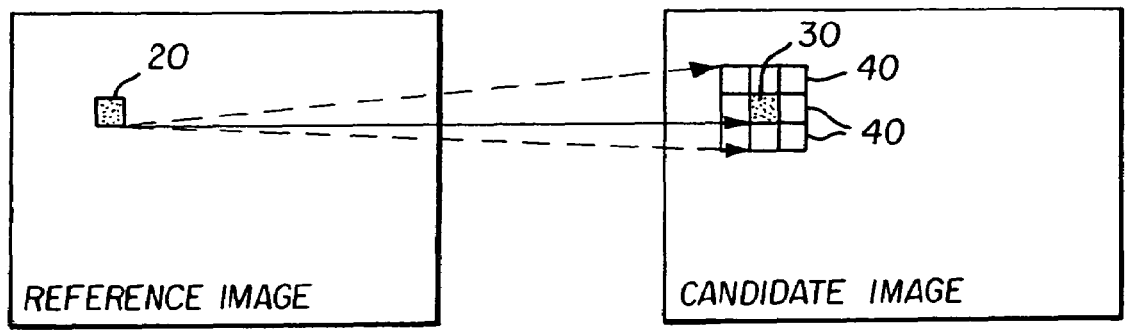
FIG. 10 is diagram illustrating the comparison between block histograms.
FIG. 11 is diagram of an example of best intersection mapping for three segment analysis.

Referring to FIGS. 9A and 9B, there is illustrated a flowchart of the block-based histogram correlation used in the above analyses. First, a histogram of the entire image of both images is computed S50, a global histogram. A comparison of the two histograms is performed by histogram intersection value S60 illustrated the following equation:

$$Inter(R, C) = \frac{\sum_{i=1}^{n} \min(R_i, C_i)}{\sum_{i=1}^{n} R_i}$$

where R is the histogram of the reference image, C is the histogram of the candidate image, and n is the number of bins in the histogram. If the intersection is under a threshold S65, preferably 0.34, although other thresholds may be used, the images are different. If the threshold is met or exceeded S65, then a block-based histogram correlation will be performed S70. In this regard, each image will be divided into blocks of a given size, preferably 32×32 pixels in the present embodiment. It is instructive to note that those skilled in the art may vary the block size depending on the resolution of the image. For each block, a color histogram is computed. Referring to FIG. 10, if one image is considered a reference image and one image a candidate image, the images are compared in the following way. Each block 20 of the reference image is compared to the corresponding block 30 of the candidate image and to the adjacent blocks 40, e.g., 8 blocks in the present embodiment.

Referring to FIG. 9A, the block histograms between the reference image and the candidate image are compared using the histogram intersection equation defined above S80. The average intersection value is derived by computing the average of the best intersection values from each of the block comparisons S90. This average intersection value will be compared to a low threshold (preferably 0.355), and a high threshold (preferably 0.557). If the average intersection value is below the low threshold S95, the two images are considered different. If the average intersection value is above the high threshold S96, then the two images are considered similar. If the average intersection value is between these two thresholds, further analysis will be performed as described below (3-segment average intersection map S100).

Referring to both FIGS. 9B and 11, a 3-segment analysis will be performed to determine if the two images may contain a similar subject. This is performed by first forming a map 60 which contains the average of the two highest intersection values of each of the block comparisons; for example, 9 comparisons were performed in the illustration of FIG. 10, the average of the highest two will be used for map 60. FIG. 11 illustrates, for example, a 9×6 block although it should be understood that the map size depends on the size of the image. This map is divided into three parts: the left portion 70a, the center portion 70b, and the right portion 70c. If the average intersection value of the center portion 70b is higher than a threshold (preferably 0.38) S105, the two images may contain a very similar subject in the center portion 70b of the image, and the two images may be considered to be similar by subject. In addition, the comparisons of the histogram will be performed with the reference and candidate images reversed. If the two images are similar both methods should give substantially similar correlation; obviously if they are different, the results will not be similar. The images are then checked S110 to determine if there is a high intersection value in one of the directions, right, left, up, and down.

Figure 12:
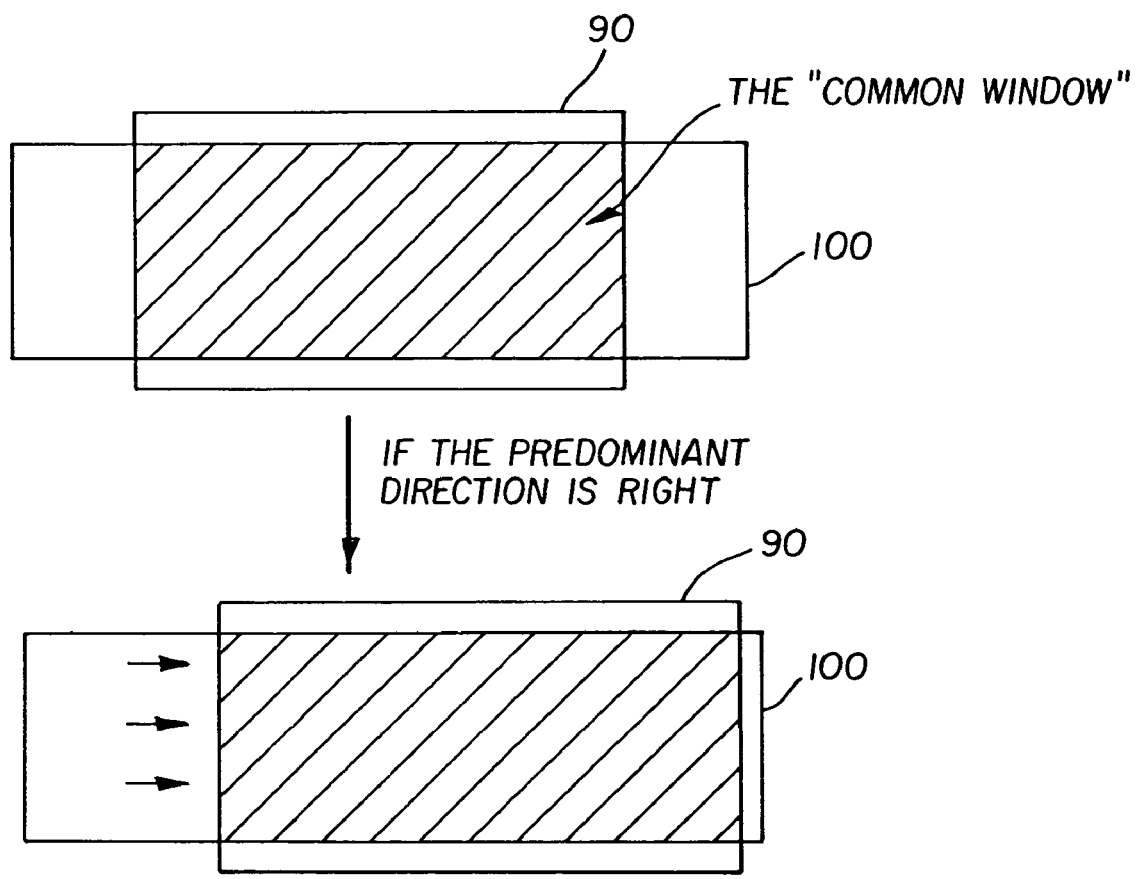
FIG. 12 is an illustration of shift detection within the block based histogram correlation.

Referring to FIGS. 9B and 12, shift detection is used to determine the case when the two images 90 and 100 (of two different sizes in the drawing) have very similar subject that appears in different locations of the image. For example, the main subject may be situated in the center of one image and to the left-hand side of the other image. Such a shift can be determined by recording both the best intersection values of the reference blocks, as well as the coordinates of the corresponding candidate blocks. This is achieved by comparing the intersection values of the blocks in four directions (right, left, up, and down). The entire image will be shifted by one block (as illustrated by the arrows) in one of the directions (right in the drawing) where the best intersection value is the highest. The above analysis and the shift can be repeated S120 to check for similarity.

Figure 13:
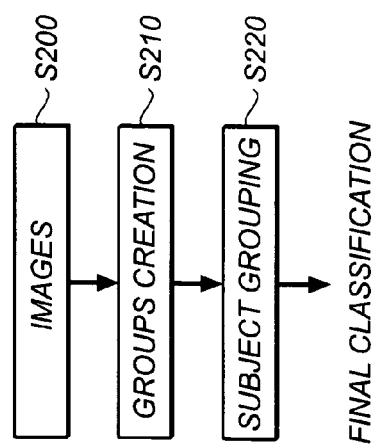
FIG. 13 is a block diagram illustrating an over view of a method for automatically classifying images into events according to the present invention.

Turning now to FIG. 13, an alternative method is shown for automatically classifying images into events according to the present invention. The event clustering algorithm used by this alternative method is partly based on the event-clustering algorithm shown in FIG. 1, which uses date and time information. Nevertheless, the two algorithms differ in a number of ways:

No date or time information is utilized in the algorithm shown in FIG. 13; thus, the output of the event-clustering algorithm without date and time will be close to a "subject grouping" kind of classification. Typically, when date/time information is present, a classification in two levels is possible, i.e., classification into event and sub-event levels. Without date or time information, only one level of classification is feasible; thus, there will be no distinction between events and sub-events. Image correlation based on the block-based color histogram technique described in commonly-assigned U.S. Pat. No. 6,351,556 will be used. This is the same image similarity technique as used for the algorithm with date and time shown in FIG. 1.

The overall method of the algorithm shown in FIG. 13 retains the same architecture as the method shown in FIG. 1—but is simpler. The output of the event-clustering algorithm without date and time will effectively contain one event divided into a number of sub-events, i.e., effectively one level. The date/time clustering and boundary checking functions performed in connection with step S20 of FIG. 1 have been removed because these functions were using date and time information. The group merging step is merged with the subject grouping step. The refinement step S40 has been removed because it is useful only when there is a classification in two levels (events plus sub-events). Finally the subject grouping function is completely changed (the previous function was using date and time information).

FIG. 13 shows an overview of a method employing an event-clustering algorithm for images without date and time information. The images may be input from a variety of digital sources, including such digital sources as a digital camera, a film scanner for scanning a photographic film, a CD ROM (such as Kodak Picture CD), image files in a user hard disk, and the like. A group of images are input S200 in chronological order to a groups creation step S210, where the images are divided into smaller groups based on image similarity. Classification of the smaller groups is then carried out in a subject grouping step S220. The groups creation step S210 in FIG. 13 is similar to the step S30 used in FIG. 1 for the event-clustering algorithm with date and time information. Chronological comparisons are performed using a block-based histogram algorithm to divide the set of images into smaller groups based on image similarity. (Note that "chronological" as here used merely refers to a consecutive capture sequence, i.e., the "next" image is always later in time than the "previous" image, and not to date and time information.) Consequently, the set will be chronologically segmented into similar image groups. This step could be merged with the next step S220 as will be seen later on, but keeping this step separate allows both algorithms (with and without date and time) to be used in the same system.

Figure 14:
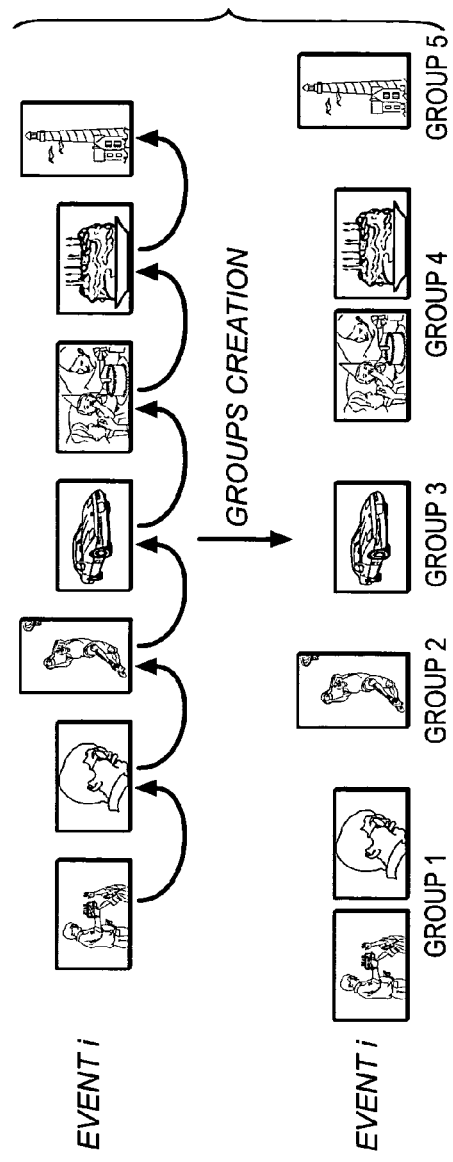
FIG. 14 is an illustration of a set of images divided into smaller groups according to a group creation step shown in the method of FIG. 13.

FIG. 14 illustrates a group of images divided into smaller groups according to the group creation step S210 shown in the method of FIG. 13, based on block-based image histograms obtained from the set of images. There are two main image similarity thresholds used in this step, a low threshold and a high threshold. A comparison of the block-based histogram data is performed by calculating a histogram intersection value, as described hereinbefore in connection with FIGS. 9A and 9B. When the histogram intersection value is less than the low threshold (0.34), the pictures are considered to be different and a group separation will occur. When the histogram intersection value is more than the low threshold, the pictures are considered to be similar enough to be in the same group. The high threshold (0.64) is used within the block-based histogram technique at different stages.

The subject grouping step S220 forms the core of the algorithm, as this is where the classification is actually carried out. The subject grouping step S220 is divided into three parts, as shown in the overall workflow diagram of FIG. 15, namely, a simple direct chronological step S230, a memory of 1 chronological comparison step S240, and a memory of 2 chronological comparison step S250. This workflow diagram shows that at the end of each step S220, S230 and S240 the current classification will be checked against specific final conditions in order to decide if an acceptable clustering has been reached. Two main final conditions have to be satisfied: the classification cannot have a number of groups above a predetermined group maximum, and the maximum number of isolated pictures allowed, i.e., pictures that do not fall within a group (or are in a "group of 1") is fixed at a predetermined isolated picture maximum. In the preferred embodiment, the classification cannot have a number of groups above the group maximum ((number of pictures)/3), and the maximum number of isolated pictures allowed is (number of pictures)/8.

The simple direct chronological comparisons step S230 corresponds exactly to the group creation step S210 shown in FIG. 13. This step is nonetheless present in the subject grouping step S220 to accommodate the case where the group creation step S210 has not been performed previously. If the group creation step S210 did not give an acceptable solution, i.e., there were too many of the smaller groups, there are at least two alternatives for improving the classification results. One alternative is to decrease the image similarity threshold values which will result in more similar pictures, i.e., fewer of the smaller groups, but at the cost of the quality of the grouping. A better alternative is to make more comparisons, i.e., not constraining the comparisons to adjacent pictures but including the neighboring pictures as well, since the goal is generally to keep the image similarity thresholds as high as possible.

Figure 15:
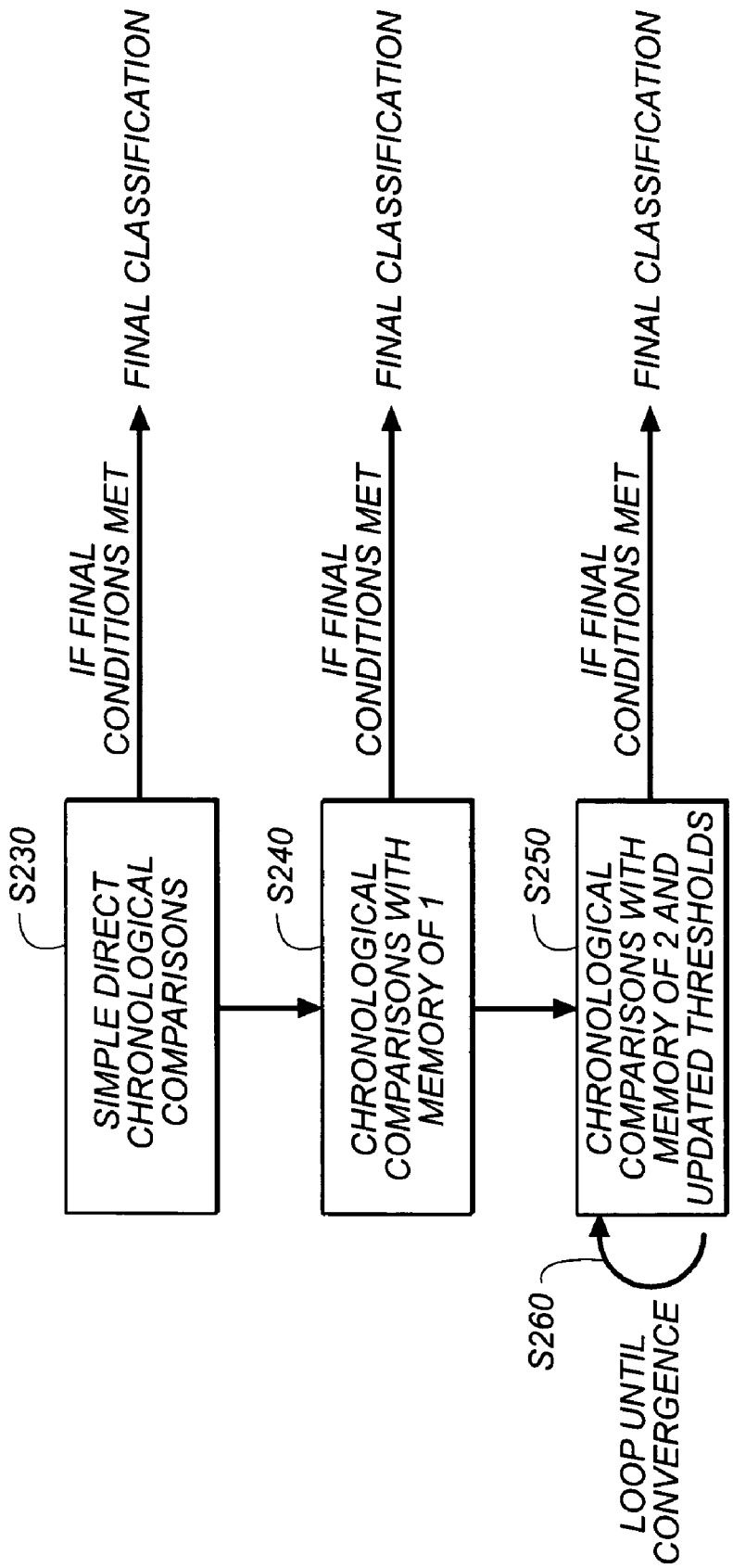
FIG. 15 is a block diagram of the subject grouping step shown in the method of FIG. 13.
Figure 16:
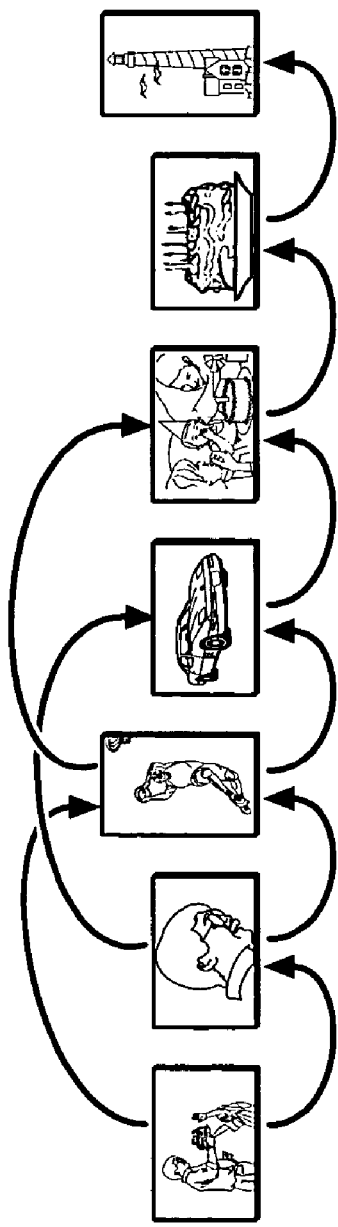
FIG. 16 is a graphical illustration of the memory of 1 step shown in FIG. 15.

The latter alternative has been adopted in the memory of 1 chronological comparisons step S240, which is shown in the workflow diagram of FIG. 15 and graphically illustrated in FIG. 16. In this step S240, each picture is compared to its direct neighbor pictures (right and left) with a low threshold of 0.34 and to its second neighbor pictures, if necessary, with a low threshold of 0.46. The image similarity thresholds are higher when the pictures are not adjacent because there is greater need for extra security since the probabilty of the pictures being in the same group is less than when the pictures are adjacent. When two images are found to be similar they will be grouped together as well as every picture that is between them (i.e., 0 or 1 pictures in this case).

Figure 17:
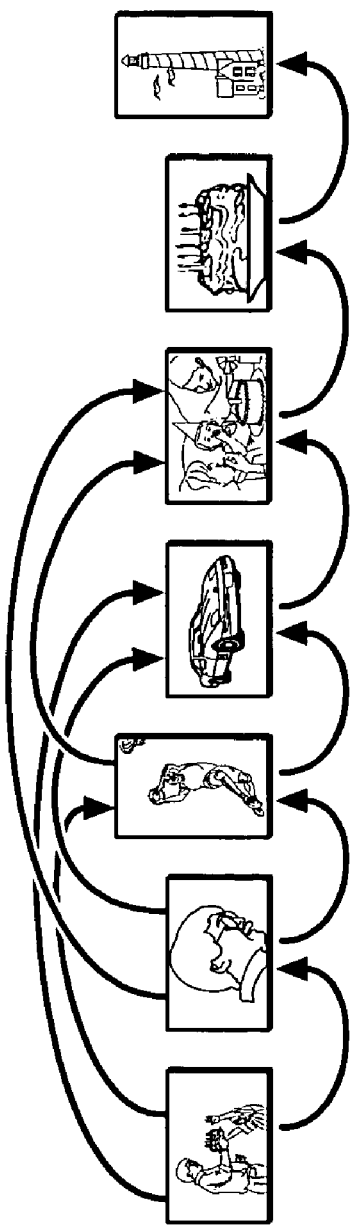
FIG. 17 is a graphical illustration of the memory of 2 step shown in FIG. 15.

The memory of 2 chronological comparisons step S250 is similar to the memory of 1 chronological comparisons step S240 except that a jump of two images is now allowed when doing the comparisons instead of a jump of one image only. Each picture will be compared, if necessary, to its two direct adjacent neighbors with a low threshold of 0.34, its second neighbors with a low threshold of 0.46 and its third neighbors (three pictures away) with a low threshold of 0.48. A graphical illustration of the approach of the memory of 2 chronological comparisons step S250 is illustrated in FIG. 17.

If at the end of the first iteration through the memory of 2 chronological comparisons step S250 in FIG. 15, the classification does not satisfy the final conditions, we are faced with the same problem that we faced previously, i.e., should there be more comparisons between pictures or is it better to decrease the threshold values? Since the probability of finding two similar pictures that are separated by more than two images is very small, it was determined to decrease the image similarity thresholds. More specifically, once it is determined that the memory of 2 chronological comparisons step S250 cannot meet the final conditions, the method loops in a further iteration step S260 until convergence is reached by lowering the thresholds. At each iteration of the memory of 2 chronological comparisons step S250 the thresholds will be changed according to the following equation, where the current threshold value Ti(N) is computed as:

$$Ti(N)=Ti-((N*0.015)/(i+1))$$

and Ti is the initial threshold with i the number of pictures between the two images, and N is the Nth iteration of the memory of 2 chronological comparisons step S250. Thus, $T_0=0.34$, $T_1=0.46$ and $T_2=0.48$.

The value 0.015 is a decrement factor, and it is chosen in a way that it is not too "small", which would have increased the number of iterations needed to achieve the desire classification, but not too "large" so as to miss the ideal classification. Our experience during the testing of the algorithm led us to this value for the decrement factor; it should be clearly understood that other values may prove workable. The factor (i+1) represents the fact that different rates for decrements are used depending on "how far" the two pictures are from each other. It is more likely that the closer the pictures are the better chance they will be similar. Thus, the thresholds will decrease faster for the comparisons with adjacent pictures than for pictures separated by one or two images. In the preferred embodiment, the number of iterations is limited to N=9, which gives $T_0(9)=0.205$. Usually when the thresholds have to go so low it indicates a problem with the number of isolated pictures. The ideal would be to keep the thresholds as high as possible −0.30 and above, so the classification remains on "good" decisions.

The invention has been described with reference to a preferred embodiment. However, it will be appreciated that variations and modifications can be effected by a person of ordinary skill in the art without departing from the scope of the invention.

What is claimed is:

1. A computer-mediated method for obtaining and automatically classifying images into events, the method comprising the steps of:

(a) providing a group of images from a digital source, wherein said images are in chronological order and lack other date and time information;
 (b) clustering the images into smaller groups based on chronological image similarity of nearby images by computing histograms of the images and comparing histogram intersection values obtained therefrom with one or more thresholds, whereby the clustering based on chronological image similarity is done in at least one stage by comparing each image with its direct neighboring images in said chronological order; and
 (c) evaluating the clustered images against a final condition related to at least one of a predetermined group maximum for the number of smaller groups and a predetermined maximum number of isolated pictures, whereby the smaller groups are classified as events if the final condition is met.

2. The method as in claim 1, wherein the clustering based on chronological image similarity in step (b) is done in at least two stages by comparing each image with its direct neighboring images and secondly with its second neighboring images.

3. The method as in claim 1, wherein step (b) includes clustering the images into smaller groups based on chronological image similarity of nearby images by using a block-based histogram technique.

4. The method as in claim 3, wherein the block-based histogram technique comprises analyzing the events for content by dividing the images into a plurality of blocks and grouping the images into subject grouping based on block-based histogram correlation which includes computing a color histogram of each block and computing a histogram intersection value which determines the similarity between blocks, thereby refining and improving the overall classification and subject grouping of the events.

5. The method as in claim 1, whereby if the final conditions are not initially met, further comprising the step of decrementing one or more of the thresholds and iterating through steps (b) and (c) until the final conditions are met.

6. The method as in claim 5, wherein the number of iterations is limited.

7. The method as in claim 1, wherein the digital source is a digital camera.

8. The method as in claim 1, wherein the digital source is a film scanner for scanning a photographic film.

9. The method as in claim 1, wherein the digital source is a CD ROM.

10. The method as in claim 1, wherein the digital source is one or more image files from a user hard disk.

* * * * *